ELISHA HUGHES.

Improvement in Shingle Machines.

No. 121,105.    Patented Nov. 21, 1871.

Witnesses:
John Becker.
Francis McArdle.

Inventor:
E. Hughes,
per Munn & Co.
Attorneys.

121,105

UNITED STATES PATENT OFFICE.

ELISHA HUGHES, OF GOWIE, CANADA, ASSIGNOR TO G. MILLER AYLESWORTH, OF SAME PLACE.

IMPROVEMENT IN SHINGLE-MACHINES.

Specification forming part of Letters Patent No. 121,105, dated November 21, 1871.

*To all whom it may concern:*

Be it known that I, ELISHA HUGHES, of Gowie, in the Province of Ontario and Dominion of Canada, have invented a certain Improved Bolt-Sawing Machine; and I do hereby declare that the following is a full, clear, and exact description thereof, which will enable others skilled in the art to make and use the same, reference being had to the accompanying drawing forming a part of this specification.

My invention consists in the improvement of bolt-sawing machines, as hereinafter fully described and subsequently pointed out in the claim.

Figure 1:
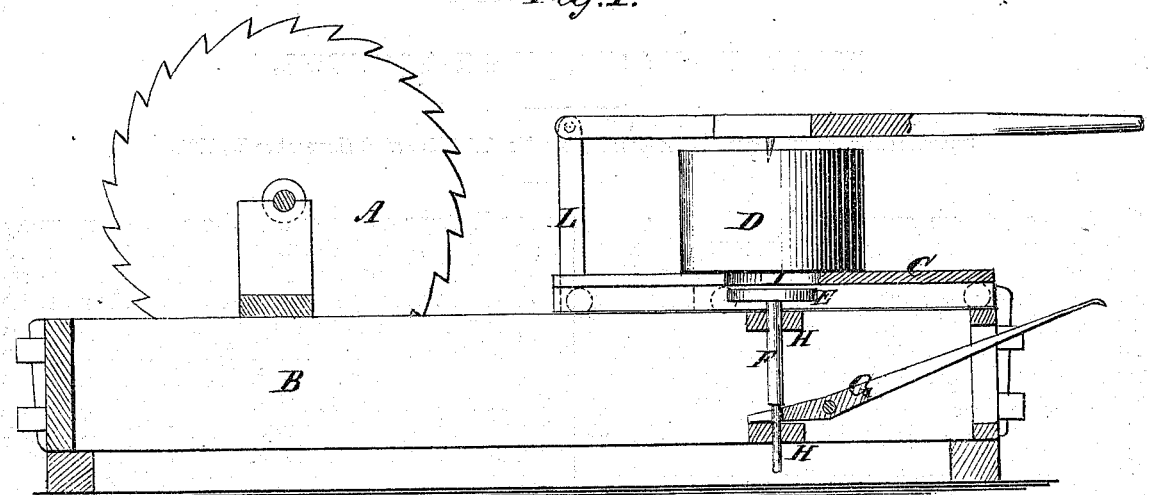
Figure 2:
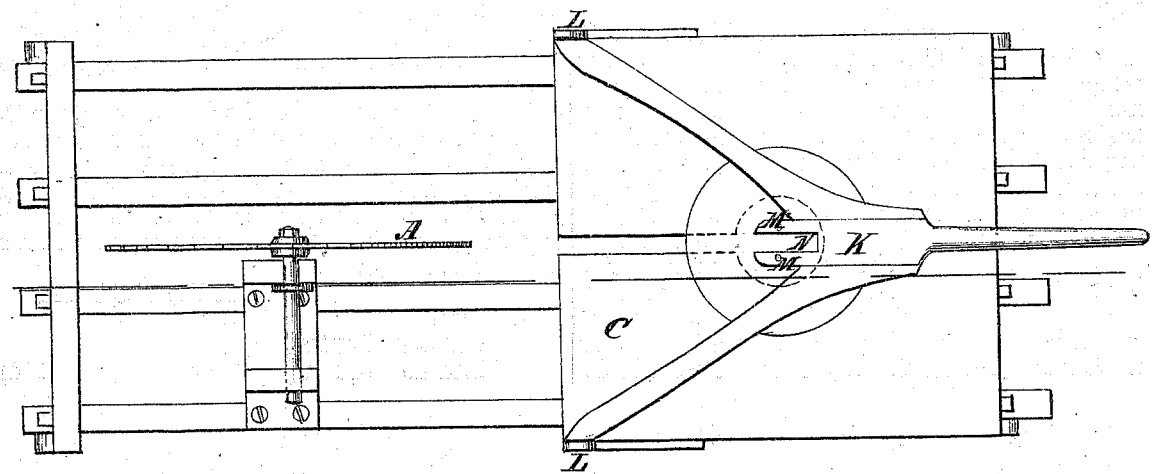

Figure 1 is a longitudinal sectional elevation of my improved machine, and Fig. 2 is a top view.

Similar letters of reference indicate corresponding parts.

A is a large circular saw, mounted on any suitable frame, B. C is a carriage on said frame, adapted to receive the block D, to be quartered near the center, and carry it up to and away from the saw, the said block setting endwise and being cut to the center by the saw each time it is moved up. E is a horizontally-revolving turn-table, mounted on the top of a vertical shaft, F, which is stepped in the end of the short arm of a lever, G, and supported in bearings H of the frame, so that it can rise and fall, being lifted by the said lever, and falling back by its gravity. The carriage is provided with a large hole, I, in its center—that is, directly over the turn-table when it stops at the end of the movement away from the saw—and the block to be sawed is placed over said hole, so that after each cut and the return of the carriage the attendant can raise the block on the turn-table by forcing the outer end of the lever down by his foot, and then turn the block readily by hand to adjust it for the next cut, after which it is let down on the carriage and moved up to the saw. K is a forked lever, pivoted to standards L on the side of the carriage next to the saw, and provided with dogs M or pins for entering the block to hold it, by the pressing of the free end of the lever down, which the attendant does as he pushes the carriage to the saw. These points or dogs are so arranged on the lever that in cutting to the center of the block they pass slightly beyond the cutting-edge of the saw, enabling them to engage and hold the last two bolts of a block.

Having thus described my invention, what I claim as new, and desire to secure by Letters Patent, is—

1. The combination of the saw A, carriage C, and turn-table E, all substantially as specified.

2. An apertured and traveling carriage C, a vertically-moving turn-table, E, and a bifurcated lever, K, combined as described, in a bolt-sawing machine, with a stationary saw, as and for the purpose specified.

ELISHA HUGHES.

Witnesses:
 EDWARD LEECH,
 ROBERT LEECH. (174)